United States Patent [19]

Van Gasse

[11] 4,315,884
[45] Feb. 16, 1982

[54] PROCESS FOR THE PREPARATION OF SHAPED ARTICLES

[75] Inventor: René L. E. Van Gasse, Opglabbeek, Belgium

[73] Assignee: Stamicarbon, B.V., Geleen, Netherlands

[21] Appl. No.: 24,435

[22] Filed: Mar. 23, 1979

[30] Foreign Application Priority Data

Mar. 25, 1978 [NL] Netherlands ............... 7803224

[51] Int. Cl.³ ................... B29D 9/00; B29B 1/04
[52] U.S. Cl. .......................... 264/255; 264/349; 525/934
[58] Field of Search .............. 264/245, 246, 255, 349; 525/934; 260/34.2

[56] References Cited

U.S. PATENT DOCUMENTS

| | | | |
|---|---|---|---|
| 3,085,988 | 4/1963 | Hull et al. | 260/34.2 |
| 3,230,284 | 1/1966 | Iverson et al. | 264/245 |
| 3,784,664 | 1/1974 | Nicklin | 264/246 |
| 3,801,693 | 4/1974 | Stallings et al. | 264/246 |
| 3,873,493 | 3/1975 | Labana | 260/34.2 |

FOREIGN PATENT DOCUMENTS

| | | | |
|---|---|---|---|
| 572237 | 3/1959 | Canada | 264/255 |
| 47-16990 | 5/1972 | Japan | 264/245 |
| 50-34363 | 4/1975 | Japan | 264/255 |
| 1406229 | 9/1975 | United Kingdom | 264/255 |

*Primary Examiner*—James B. Lowe
*Attorney, Agent, or Firm*—Cushman, Darby & Cushman

[57] ABSTRACT

The invention concerns a process in which a shaped article is prepared by first coating the inside of a mold with a coating powder, curing the coating, introducing a thermosetting mass in the mold and curing to form an article provided with a decorative layer. The invention consists in the use of a polyester-based coating powder, obtained by absorbing a liquid catalyst in part of the unsaturated components making up the powder, separately grinding that part and a mixture of the remaining components to about the same particle size and mixing the powders thus obtained. The invention assures better curing of the coating.

5 Claims, 2 Drawing Figures

PROCESS FOR THE PREPARATION OF SHAPED ARTICLES

BACKGROUND OF THE INVENTION

Shaped articles may be obtained by introducing an amount of thickened unsaturated polyester dissolved in a copolymerisable monomer in a mold and hardening the mass by the application of heat. In many cases the walls of the mold or part of them are first coated with a thermoplastic or thermosetting resin which will bond with or adhere to the polyester resin. In this manner an article provided with a decorative finish is obtained. In my copending application Ser. No. 956,042 filed on Oct. 10, 1978 now U.S. Pat. No. 4,228,113, the disclosure of which is hereby incorporated by reference, I have disclosed the use of a powdered mixture containing an unsaturated polyeser resin and a hardening catalyst in coating the inside of a mold, while said mold is still warm. As the powder melts and the resin is cured, a coating is obtained. In said application, the catalyst is mixed with the powdered resin. This means that there are only a few particles of catalyst among a large number of resin particles. If for instance about six parts of powdered catalyst are mixed with 300 parts of resin powder, the size of the respective particles being about equal, there will be only 2 particles of catalyst among 100 particles of polymerisable product as shown in FIG. 1, in which the catalyst particles are shown in black. This distribution may cause inhomogeneous curing, leading to a substandard quality of the coating layer.

FIG. 1 is a representative illustration of powdered catalyst particles dispersed within a resin powder; and FIG. 2 is a representation of powdered particles containing catalyst therein dispersed within a second catalyst powder of approximately the same size according to the present invention.

BRIEF SUMMARY OF THE INVENTION

Applicant has found that the process can be improved by using as the polyester-based coating powder a powder obtained by adsorbing a liquid catalyst or a solution of a catalyst in an inert solvent in a part of the unsaturated components making up the coating powder, said part amounting to between 5 and 20% by weight of all unsaturated components, if necessary grinding the mixture thus obtained to a particle size of between 0.02 and 0.10 mm, separately mixing the remaining components and grinding that mixture to about the same particle size and intimately mixing both powders.

In this manner a coating powder is obtained wherein the catalyst is more evenly distributed throughout the bulk of the powder, thus ensuring more complete curing of the coating. Further advantages are that liquid catalysts can be used and that the catalyst is not exposed to high temperatures which might lead to loss of catalytic activity or premature curing.

DETAILED DESCRIPTION OF THE INVENTION

Figure 1:
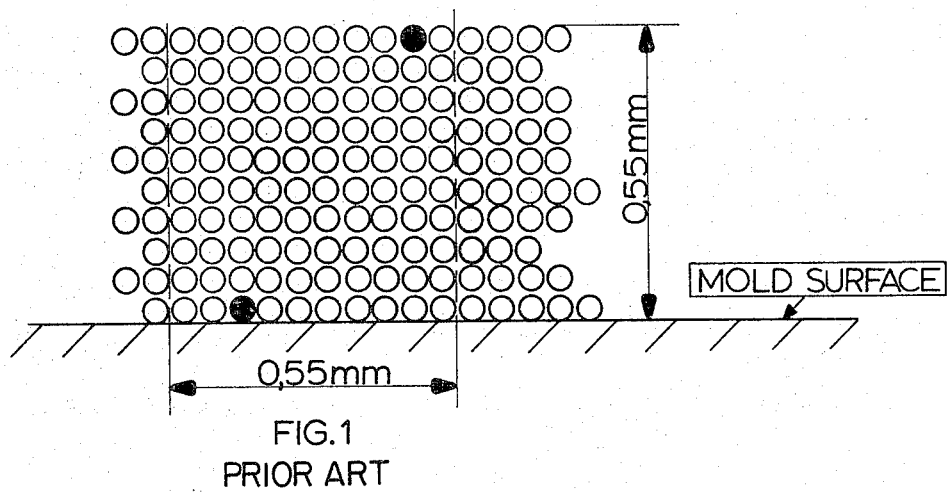

Suitable coating powders comprise 60 to 90% by weight of an unsaturated solid polyester, 5 to 20% by weight of a diallylphthalate prepolymer and 5 to 20% by weight of a high-boiling polyunsaturated crosslinker and at least one curing catalyst. The unsaturated polyester is of the conventional type and can be obtained by condensation of an unsaturated dicarboxylic acid or its anhydride, for instance maleic anhydride, maleic acid or fumaric acid, optionally mixed with an aliphatic or aromatic dicarboxylic acid or anhydride such as phthalic anhydride or adipic acid, and a glycol such as ethyleneglycol, propylene glycol, diethyleneglycol and optionally a minor amount of a triol such as trimethylolpropane. The diallylphthalate prepolymers are well known and commercially available compounds. Suitable crosslinkers comprise triallylcyanurate, triallylisocyanurate, trimethylolpropane triacrylate. The powder comprises preferably 75 to 85% by weight of unsaturated polyester, 8 to 15% by weight of diallylphthalate prepolymer and 8 to 15% by weight of crosslinker.

The catalyst which is necessary for curing is used in an amount of between 1 and 5% by weight based on the unsaturated components. In the process according to the invention the peroxidic catalysts such as per-alcohols, per-acids, per-esters, per-carbonates, per-ethers and ketoneperoxides may advantageously be used. Examples are tert. butylperoxide, lauroylperoxide, benzoylperoxide, di-tert. butylperoxide, di-benzoylperoxide, tert. butylperbenzoate and tert. butylperpivalate. Solid or highly viscous catalysts may be dissolved in an inert solvent, which does not hinder the polymerisation and does not impair the quality of the coating. Preferably organic liquid peroxidic catalysts containing 4 to 16 carbon atoms are used. It is possible to adsorb the catalyst in the unsaturated polyester or in the mixture of unsaturated components. However, applicant has found that the catalyst is readily absorbed in the diallylphthalate prepolymer. If a powdered prepolymer is used, the powder is still free-flowing after absorption of the catalyst.

If necessary the charge containing the catalyst is ground to a particle size of between 0.2 and 0.10 mm, preferably, between 0.03 and 0.08 mm. The components making up the remainder of the powder are intimately mixed, preferably in a molten state, after which the mixture is ground to about the same particle size as the other charge. To prevent overheating during the grinding operations one may cool the mass prior to or during grinding to a low temperature, e.g. with the aid of liquid nitrogen.

The coating powder may further contain other conventional additives such as release agents, pigments, flame-retarding agents, curing accelerators and the like.

The two charges are intimately mixed. The coating powder is applied in a layer having a thickness of preferably 0.3 and 0.7 mm. The wall of the mold should be at a temperature of between 90° and 120° C. on application of the powder. The powder is made to melt and to cure by maintaining the mold at a temperature between 90° and 150° C. When the coating is at least partially cured, the plastic mass of thermosetting resin containing a filler is introduced in the mold, after which the whole is cured at an increased temperature and pressure to form a shaped article provided with a decorative coating.

The plastic mass of thermosetting resin may be a conventional mixture of an unsaturated polyester, styrene and inorganic powdered filler such as silica, talc, calcium carbonate, glass fibre and a thickening agent such as magnesium oxide. The components are mixed and left to thicken in the form of a dough or sheet. The invention is especially suited for a process in which the mixture is shaped to a sheet, optionally between two glass-fibre mats or fleeces and is left to thicken, thus forming a pliable sheet having self-levelling properties. It is also possible to thicken the mixture to a more pasty condition and then applying it to one or between two glass-fibre mats. It is also possible to put a reinforcing glass-fibre mat in the mold before introduction of the thermosetting mass. The process according to the invention may also be used with other thermosetting masses, e.g. based on epoxy-resin.

The invention will be further elucidated by reference to the following example.

EXAMPLE

Figure 2:
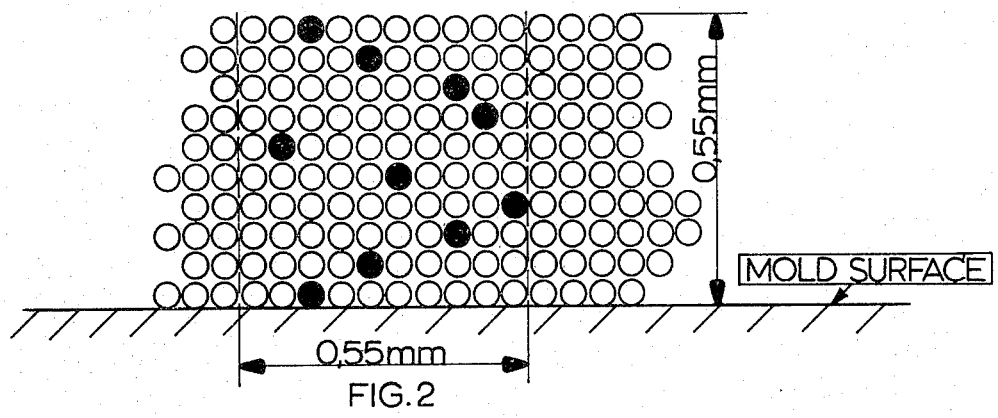

A powder is obtained by absorbing 3 parts by weight of tert. butyl perbenzoate in 30 parts of a coarse powdered diallylphthalate prepolymer, cooling the still free-flowing powder thus obtained with the aid of liquid nitrogen and grinding it to a particle size of 0.03 and 0.08 mm. A second powder is obtained by mixing in an extruder 240 parts of unsaturated solid polyester resin, 30 parts of triallylisocyanurate, 2 parts of zinc stearate and 2.5 parts of silicon dioxide pigment, extruding and cooling the melt and grinding it to the same particle size between 0.03 and 0.08 mm. Next the two charges of powder are intimately mixed to form the coating powder. In this coating powder there are over 10 catalyst-containing particles in every 100 particles, as shown in FIG. 2.

An unsaturated polyester is prepared by condensation of 1.5 moles of hydrated bisphenol A, 1.5 moles of propylene glycol, 0.5 mole of phthalic anhydride, 1.0 mole of maleic anhydride and 1.0 mole of fumaric acid. A resin composition is made by dissolving 650 parts of the unsaturated polyester in 235 parts of styrene and 100 parts of diallylphthalate and adding 10 parts of tert. butyl perbenzoate, 5 parts of water and 10 parts of magnesium oxide. Next a thermosetting mass is prepared by mixing 85 parts of calcium-magnesium carbonate having a particle size of less than 0.2 mm, 2 parts of glass-fibre having a length of 6 to 9 mm and 13 parts the resin composition obtained above. A glass-fibre fleece is laid on a polyethylene film, the thermosetting mass is spread on said fleece, covered with a second glass-fibre fleece and a second polyethylene film and this sandwich is left to thicken for about 30 hours.

The inside surfaces of a two-piece flat metal mold are heated to 110° C. The coating powder is sprayed on the inside surface to a thickness of about 0.5 mm, after which the mold halves are heated to 140° C. for a few minutes. Next, the polyethylene film is removed from the sheet-like thermosetting mass and a piece of appropriate size is cut from the sheet and put in the mold. The mold is closed and curing is effected by heating to about 160° C. for a few minutes. The mold is cooled and the file-like test piece is taken from the mold. The surface is covered with a perfectly cured, hard and scratch resistant coating.

I claim:
1. In a process for the preparation of a shaped article, comprising:
    (a) coating at least part of the wall of a mold with a coating powder based on an unsaturated polyester resin,
    (b) curing said coating powder to form a coating layer, and thereafter
    (c) introducing a plastic thermosetting mass in the mold and
    (d) curing the whole to a shaped article provided with a coating thereon,
    the improvement wherein said coating powder applied in step (a) has been obtained by:
    (1) forming a catalyst-containing powder by absorbing a liquid catalyst, or a solution of a catalyst in an inert solvent, in between 5 and 20% by weight of all unsaturated components in making up said coating powder;
    (2) separately mixing the remaining components to make a mixture and grinding said mixture to about the same particle size as the catalyst-containing powder; and
    (3) intimately mixing together the powders of (1) and (2).

2. Process according to claim 1, wherein the liquid or dissolved catalyst is absorbed in a prepolymer of diallylphthalate.

3. Process according to claim 1 or 2, wherein the catalyst is an organic liquid peroxidic compound of 4 to 16 carbon atoms.

4. Process according to claim 1 wherein the mixture of catalyst on unsaturated components of step (1) is ground to a particle size of between 0.02 mm and 0.10 mm.

5. Process according to claim 4, wherein the coating powder has a particle size between 0.03 and 0.08 mm.

* * * * *